United States Patent [19]

Juret

[11] Patent Number: 5,527,192

[45] Date of Patent: Jun. 18, 1996

[54] CARD CONNECTOR CONTACT ELEMENT

[75] Inventor: Bernard Juret, Crissey, France

[73] Assignee: ITT Corporation, New York, N.Y.

[21] Appl. No.: 315,798

[22] Filed: Sep. 30, 1994

[30] Foreign Application Priority Data

May 5, 1994 [DE] Germany ............................ 9407499 U

[51] Int. Cl.$^6$ ........................................................ H01R 4/18
[52] U.S. Cl. .................................... 439/862; 439/886
[58] Field of Search ............................ 439/842, 851–856, 439/861, 862, 886, 630–636, 637, 867

[56] References Cited

U.S. PATENT DOCUMENTS

| | | | |
|---|---|---|---|
| 3,283,291 | 11/1966 | Krol et al. ........................... | 439/862 |
| 3,323,102 | 5/1967 | Minor ................................... | 339/258 |
| 3,583,573 | 6/1971 | Robshaw .............................. | 439/886 |
| 3,787,801 | 1/1974 | Teagno et al. ....................... | 339/258 |
| 3,866,999 | 2/1975 | Doherty, Jr. ......................... | 339/17 |
| 4,021,091 | 5/1977 | Anhalt et al. ........................ | 339/75 |
| 4,026,627 | 5/1977 | Benasutti ............................. | 439/886 |
| 4,555,152 | 11/1985 | Johnson et al. ..................... | 339/17 |
| 4,593,463 | 6/1986 | Kamono et al. .................... | 29/884 |
| 5,186,665 | 2/1993 | Kelly et al. ......................... | 439/862 |
| 5,226,826 | 7/1993 | Nillson . | |
| 5,286,957 | 2/1994 | Defranse ............................. | 235/441 |

FOREIGN PATENT DOCUMENTS

| | | |
|---|---|---|
| 0468828 | 1/1992 | European Pat. Off. . |
| 2534419 | 4/1984 | France . |
| 3832588 | 3/1990 | Germany . |
| 4118312 | 10/1992 | Germany . |

*Primary Examiner*—David L. Pirlot
*Attorney, Agent, or Firm*—Thomas L. Peterson

[57] ABSTRACT

A contact element has a mating portion (20, FIG. 4B) that lies slightly above a card-engaging surface (48) to engage a terminal on a data card, with the mating portion constructed to avoid damage from small objects improperly pressed sidewardly against the mating portion. The middle (23) of the mating portion which lies above the horizontal card-engaging surface, is curved about both laterally-extending and longitudinally-extending axes, to form a dome with a convex upper surface, or a "spoon" shape.

7 Claims, 3 Drawing Sheets 5,527,192

CARD CONNECTOR CONTACT ELEMENT

BACKGROUND OF THE INVENTION

One type of card connector includes a housing forming a flat horizontal card-engaging surface with slots therein. Contact elements mounted on the housing, have mating portions that project through housing slots and lie slightly above the card-engaging surface. Each contact may be formed of a metal strip of uniform width, with the mating portion being bent into a largely 180° loop with the top of the loop projecting above the card-engaging surface. Such contacts are seldom damaged when a card is pressed down so its terminals press down against the contact mating portions. However, such contacts are readily damaged by a vandal or unknowledgeable person moving an object such as a key or toothpick over the card-engaging surface. Such an object can pry up the looped mating portion or bend it so it is not operational. As cards and connectors become smaller, the contacts become smaller and more fragile. Contacts with mating portions that resisted damage from objects, would be of value.

SUMMARY OF THE INVENTION

In accordance with one embodiment of the present invention, a card connector and contact element therefore are provided which are vandal resistant. The card connector includes a housing with a horizontal card-engaging surface and with slots therein. A plurality of contacts are mounted on the housing, with each contact having an outer mating portion that includes a middle lying above the card-engaging surface to engage the terminals of a card laid against the surface. The middle is curved about both a laterally-extending axis and a perpendicular longitudinally-extending axis, which both extend horizontally, to form a dome whose upper surface is convex. The double convexity results in the contact being pushed down below the card-engaging surface when pressed in almost any direction by an object lying above the card-engaging surface. Thus, the mating portion recedes into a slot when pressed in almost any direction by an object above the card-engaging surface, which avoids damage to the contact.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
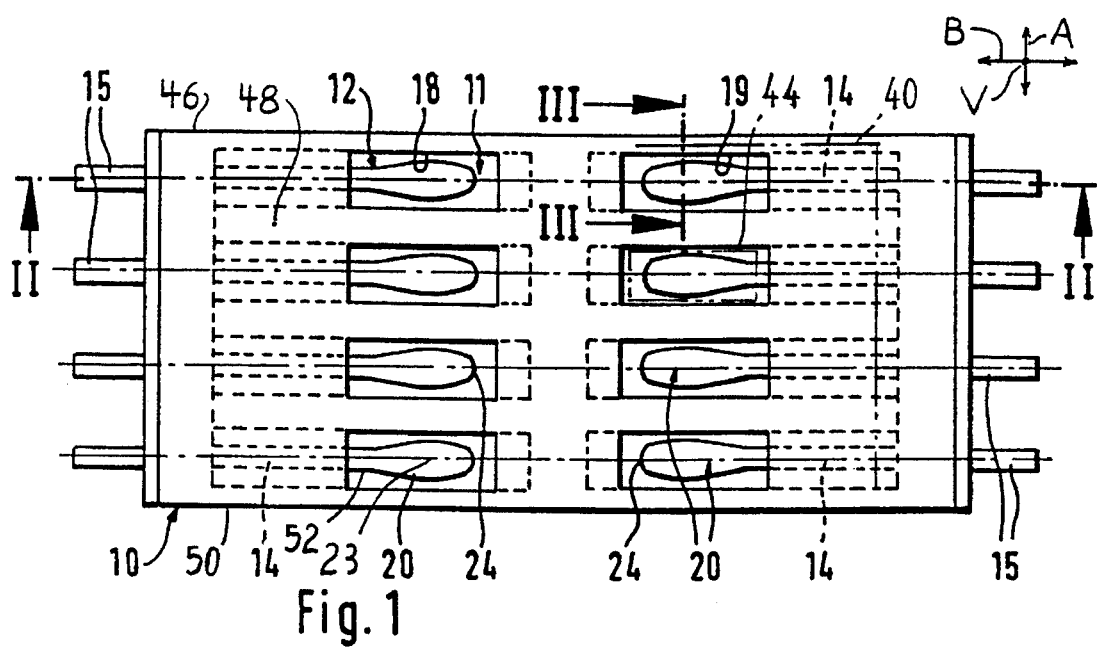
FIG. 1 is a plan view of a card connector constructed in accordance with one embodiment of the present invention.
Figure 2:
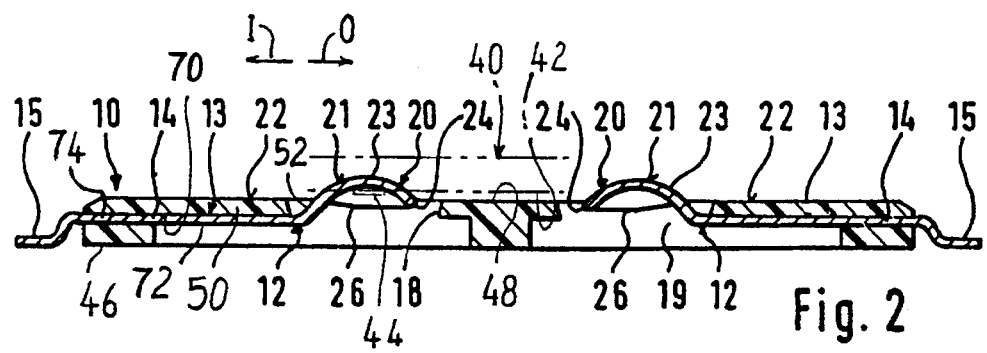
FIG. 2 is a sectional view taken on line II—II of FIG. 1.

FIG. 2 illustrates a card connector 10 which is designed to engage a data card 40 that has a lower face 42 carrying a plurality of terminals 44. As shown in FIG. 1, the connector includes a dielectric housing 46 with a card-engaging surface 48. In the illustrations, the card-engaging surface 48 extends in a horizontal plane, with lateral and longitudinal directions A and B extending along the surface, and with the surface being normal to a vertical direction V. The housing has a plate-like portion or wall 50 with slots 18 therein. Contact elements or contacts 12 have outer mating portions 20 that project through the slots to engage a card. The outer mating portion 20 includes an inner part 52 which projects upwardly through the slot and above the surface 48, an outer part 24 that projects downwardly back into the slot, and a middle portion or middle 23 that lies above the card-engaging surface 48.

Figure 4:
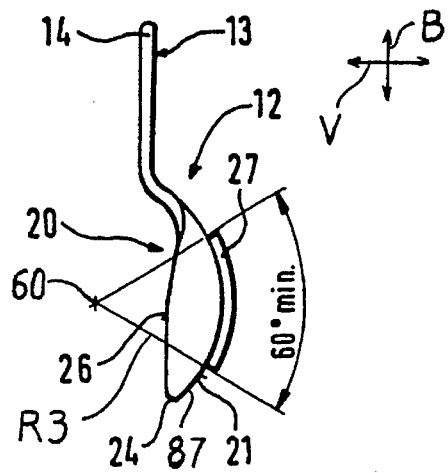
FIG. 4 is a side elevation view of a portion of one of the contact elements, or contacts of the connector of FIG. 2.
Figure 4A:
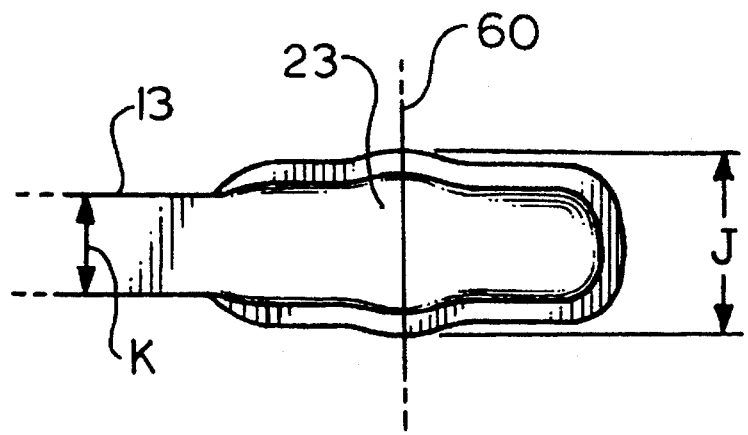
FIG. 4A is a bottom view of the portion of the contact element shown in FIG. 4.
Figure 4B:
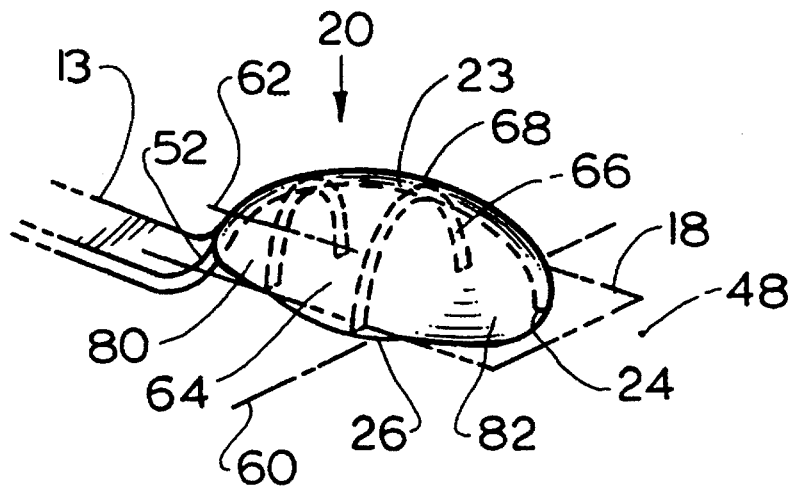
FIG. 4B is a top isometric view of the portion of the contact element of FIG. 4.
Figure 4C:
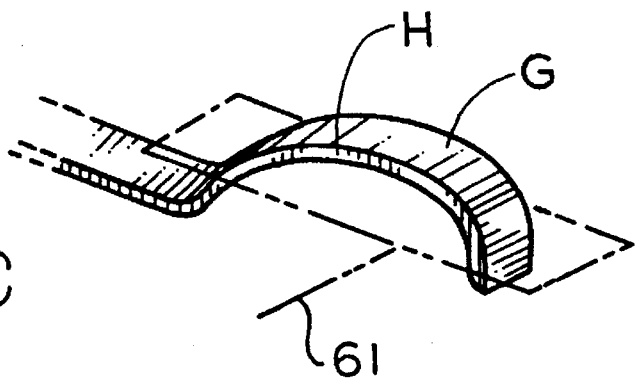
FIG. 4C is a top isometric view of a portion of a prior art contact element.
Figure 5:
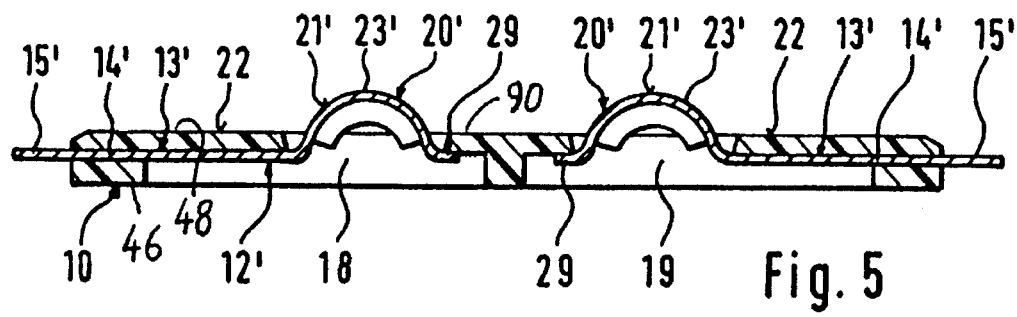
FIG. 5 is a sectional side view of a connector with contact elements constructed in accordance with another embodiment of the invention, and being a view similar to that of FIG. 2 but with different contact elements.
Figure 6:
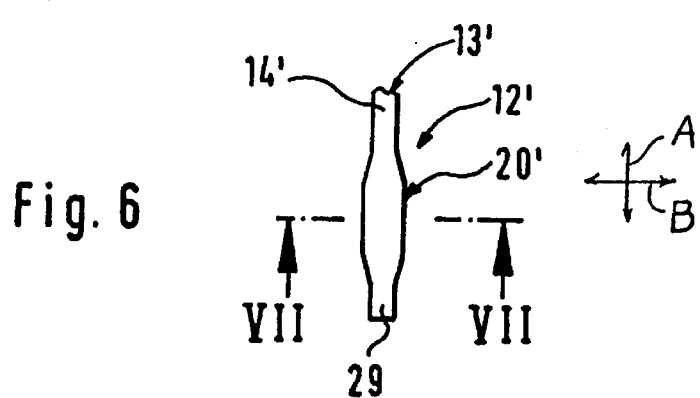
FIG. 6 is a partial top view of one of the contacts of FIG. 5.
Figure 7:
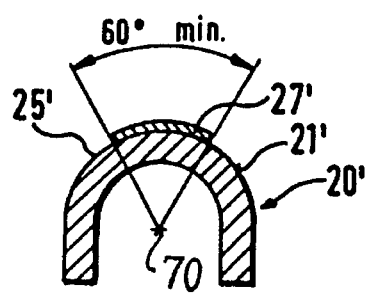
FIG. 7 is a sectional view taken on line VII—VII of FIG. 6.
Figure 8:
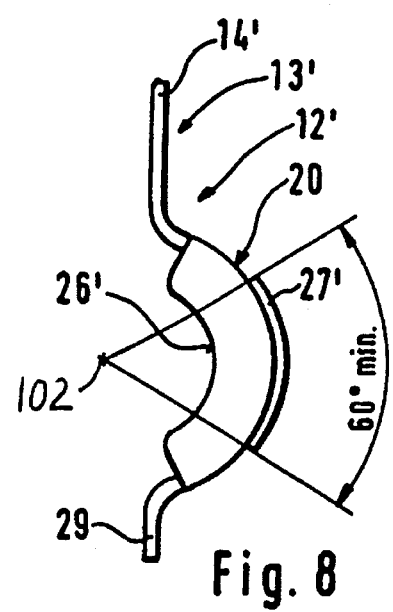
FIG. 8 is a side elevation view of a portion of one of the contact elements of FIG. 5.

In accordance with the present invention, and as shown in FIG. 4B, the middle 23 of the contact is curved about both a laterally-extending axis 60 and a longitudinally-extending axis 62 to form a spoon-shaped contact. As shown in FIG. 4C, prior art contacts have had mating portions G that were bent only about a laterally-extending axis 61, and that were formed of a band with about the same width inward of the mating portion as at the mating portion. If a vandal or unknowledgeable person projected an object such as a key or toothpick against a side edge H of the contact, or under it, he could damage the contact. Applicant's curvature of the middle 23 about the two axes 60, 62 results in a dome (preferably not spherical) with laterally opposite sides at 64, 66 that present a continuous surface that would engage any small object pressed against the side of the middle 23 that lies above the card-engaging surface 48. A force applied in almost any direction from above the card-engaging surface will cause the middle 23 to be depressed into the slot 18 and thereby avoid damage to the contact. It is intended that a card terminal engage the top 68 which is at the center of the middle 23.

As shown in FIG. 2, the plate-like part 13 of the housing has a lower surface 70 that extends both inward in the direction I and outward in the direction O of the slot 18. The contact has a band-shaped inner portion 14 with a part 72 that bears facewise against the lower surface 70 to fix the position of that contact portion. Another part 74 of each contact is molded into the housing 46 to fix its position and orientation. An extreme inner end 15 of the contact projects inwardly from the housing and can engage other terminals such as those of a circuit board. The outer part 24 of each contact mating portion 20 lies slightly below the card-engaging surface, as does the rest of the curved lower edge 26 of the middle, so that there is not an exposed edge offered to an object lying above the card-engaging surface. Accordingly, the double curved or double arched middle 23 extends to the outer part 24.

FIG. 4B indicates that a longitudinal middle side region at 64 of the domed middle 23 has a somewhat greater radius of curvature than inner and outer side regions at 80, 82 thereof.

Figure 3:
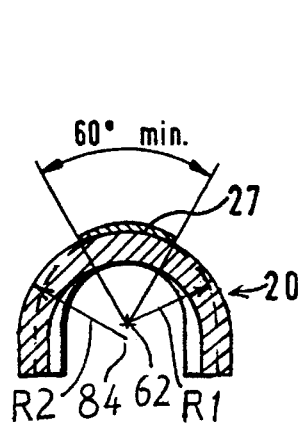
FIG. 3 is a sectional view taken on line III—III of FIG. 1.

This larger radius of curvature at 64 facilitates downward deflection of the contact when an edge of an object such as a card is pressed sidewardly against the middle 23. FIG. 3 shows that the radius of curvature R1 at the inner and outer regions is smaller than the radius of curvature R2 about the middle region, which is curved about another longitudinal axis 84. FIG. 4 shows that the curvature about the laterally-extending axis 60 is at a radius of curvature R3. The radius R3 is much larger than either radius R1 or R2, and is preferably at least twice as great. As a result, the domed middle 23 has a much longer longitudinal length along the direction B than its width along the lateral direction A. This is accomplished with contacts of relatively small lateral width, which enables several of such contacts to be placed on a housing of relatively small lateral width.

Each of the contacts is formed of sheet metal, with the inner portion 13 preferably of uniform width, and with the outer mating portion 20 having a much greater width. The outer portion is deformed into the dome shape shown, and ends up with a greater width J (FIG. 4A) than the width K of the inner portion 13 of the contact. The result is a contact of "spoon" shape it can be seen (FIG. 4B) that across the entire width of the arched contact middle 23, between its opposite sides 64, 66, the contact is continuous without any corners. As described above this has the advantage that if a person presses horizontally against the contact, as with a key or toothpick, such pressing tends to cause downward deflection of the contact.

Applicant has constructed and tested a card connector 10 of the construction illustrated. Each contact was formed of plated sheet metal of a thickness of 7 mils (1 mil equals one thousandth inch). The end portion had a width K of 25 mils, while the middle 23 of the mating portion had a maximum thickness J of 42 mils. The radius of arching or curvature R1 about the axis 62 was 18 mils, the radius R2 was 21 mils, and the radius R3 was about 70 mils, or more than twice the radii R1 and R2 about the longitudinally-extending axes. The middle 23 of each contact mating portion carried a thin gold plating 27 which extends by 60° about each axis 60, 62. The radius of curvature may vary, so that for example, one location 85 (FIG. 4) may have a different radius than another location 87. In that case, the radius of curvature is the average radius of curvature, and the axis about which the contact is curved is the average of parallel axes about which the outer surface is curved.

FIGS. 5–8 illustrate a card connector 10' which is similar to that of FIGS. 1–4 except for the outer contact portion 20' of each contact. Parts of the contacts 12' that correspond to those of FIGS. 1–4 carry the same numeral but also include a prime. The outer portion 20' has an outer part 29 that is band shaped and which lies under a location 90 of the plate-like portion 13 of the housing 46. The contact outer portion 20' has a middle 23' that is curved or bent about two axes, including a longitudinal axis 100 shown in FIG. 7 and a lateral axis 102 shown in FIG. 8, that respectively extend in longitudinal and lateral directions B, A. The radius of curvature about the lateral axis 102 is greater, preferably at least twice as great, as the radius of curvature about the longitudinal axis 100. The dual curvature or arching results in a dome-shape middle 23' which resists damage from instruments applied above the upper surface 48 of the housing. The particular contacts shown have side edges 26' whose middles lie above the card-engaging surface of the housing, although the side edges 26' can be made to extend below it. As in the case of the contacts of FIGS. 1–4, a gold plating 27' extends 60° about each axis of curvature 100, 102 and is centered on the extreme upper end of the middle.

While terms such as "horizontal" and "vertical" have been used to aid in the description of the invention, the card connector and its parts can be used in any orientation with respect to the Earth's gravity.

Thus, the invention provides contact elements or contacts and a card connector in which the contacts are especially useful, wherein the contacts have outer mating portions which resist damage from objects that are not supposed to be placed against or inserted against the contacts. The card connector has a card-engaging surface and each contact mating portion has a middle region or middle that is curved about both laterally and longitudinally-extending axes to form a dome shape whose upper surface is convex. The sheet metal material of each contact extends largely downwardly by a considerable distance (more than twice the thickness of the sheet metal material) on each lateral side of the contact. The mating portion is preferably elongated in a longitudinal direction, and the radius of curvature about a lateral axis is greater than that about a longitudinal axis. The construction of the contact mating portion helps it resist damage, by tending to move down into a recess or slot formed in the connector housing when pressed in most directions by an instrument that should not be applied to the contacts.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A card connector for engaging a data card that has a face and a plurality of terminals on said face, wherein said connector includes a housing with a housing wall having a card-engaging surface extending in perpendicular lateral and longitudinal directions, and with a plurality of slots in said surface, and wherein said connector also includes a plurality of contacts mounted on said housing with each contact having an outer mating portion with an inner part projecting upwardly out of said slot and above said card-engaging surface, an outer part projecting downwardly into said slot, and a middle connecting said inner and outer parts and lying primarily above said card-engaging surface, characterized by:

said middle is curved about both a laterally-extending axis and a longitudinally-extending axis, to form a dome extending along the entire width of the contact thereat, and said middle has a lower edge lying no higher than said card-engaging surface.

2. The card connector described in claim 1 wherein:

said housing wall is plate-like and has a lower surface;

each of said contacts includes a face inner portion that extends in an inward direction from said outer mating portion and that bears facewise against said housing lower surface.

3. The card connector described in claim 1 wherein:

said outer part of said mating portion has an outer end which forms an extreme outer end of the contact, and said dome extends along said outer part to substantially said extreme outer end of the contact.

4. The card connector described in claim 1 wherein:

said housing wall has a flat lower surface lying below said card-engaging surface, with said slots extending largely vertically between said card-engaging surface and said lower surface;

each of said contacts has an inner portion with one part that is molded into said housing and another flat part lying facewise against said flat lower surface and extending therealong to said inner part of said contact mating portion with said another flat part being free to be downwardly deflected.

5. An electrical contact element comprising:

a piece of sheet metal which has a mating portion with a top that can engage a terminal that moves down along a largely vertical direction against said mating portion, said mating portion having a laterally extending width and being arched about both longitudinal and lateral axes wherein said axes extend perpendicular to each other and to said vertical direction and lie below said top, to form a double-curved convex upper surface, said mating portion being arched across its entire laterally extending width to avoid corners across its width.

6. The contact element described in claim 5 wherein:

said piece of sheet metal has a substantially flat band portion extending inwardly from said mating portion, with said mating portion being uninterrupted across its width and having a greater width in a direction parallel to said lateral axis than said band portion.

7. The contact element described in claim 5 including:

a connector housing of dielectric material which has a plate-like wall with upper and lower surfaces and with a slot, said piece of sheet metal having an inner portion with a part of said inner portion lying below said wall lower surface, and said mating portion has laterally spaced opposite side edges that each lies below said wall upper surface and has a center lying above said wall upper surface.

* * * * *